US 9,871,740 B2

(12) United States Patent
Parthasarathy et al.

(10) Patent No.: US 9,871,740 B2
(45) Date of Patent: Jan. 16, 2018

(54) METHODS AND SYSTEMS FOR OPTIMAL DELIVERY OF INTERNET VIDEO OVER WIRELESS NETWORKS

(71) Applicant: Citrix Systems, Inc., Fort Lauderdale, FL (US)

(72) Inventors: Kannan Parthasarathy, Palo Alto, CA (US); Andrew Michael Penner, Savoy, IL (US); Fabian Breg, Savoy, IL (US); Nathanael A. Thompson, Champaign, IL (US); Robert Kidd, Champaign, IL (US); Nicholas James Stavrakos, Los Altos, CA (US); Miguel A. Melnyk, Champaign, IL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 619 days.

(21) Appl. No.: 14/066,615

(22) Filed: Oct. 29, 2013

(65) Prior Publication Data
US 2015/0120876 A1 Apr. 30, 2015

(51) Int. Cl.
*G06F 15/16* (2006.01)
*H04L 12/863* (2013.01)
(Continued)

(52) U.S. Cl.
CPC ............ *H04L 47/626* (2013.01); *H04L 65/60* (2013.01); *H04N 21/2401* (2013.01);
(Continued)

(58) Field of Classification Search
CPC ... H04L 47/2416; H04L 47/30; H04L 47/626; H04L 65/60; H04N 21/2401; H04W 28/0236
(Continued)

(56) References Cited

U.S. PATENT DOCUMENTS

| 5,822,524 A * | 10/1998 | Chen ..................... H04L 1/1848 348/E7.073 |
| 2007/0133405 A1* | 6/2007 | Bowra ................ H04L 12/2602 370/230 |

(Continued)

FOREIGN PATENT DOCUMENTS

WO    WO2004/010670 A1    1/2004

OTHER PUBLICATIONS

International Search Report and Written Opinion dated Jan. 27, 2015; International Application No. PCT/US2014/062988; (13 pages).

(Continued)

*Primary Examiner* — Normin Abedin
(74) *Attorney, Agent, or Firm* — Allen, Dyer, Doppelt & Gilchrist, P.A.

(57) ABSTRACT

A system and method is provided for controlling multimedia data transmission to a communication device via a network. The system comprises a de-muxer configured to obtain a first multimedia data for transmission and a flow controller configured to evaluate an estimated buffer time associated with the communication device. If the estimated buffer time satisfies a first threshold condition, the flow controller updates a current transmitting state to be a pacing state. And if the estimated buffer time satisfies a second threshold condition, the flow controller updates the current transmitting state to be a bursting state. The system also comprises a muxer configured to transmit the first multimedia data at a transmitting rate corresponding to the bursting state or the pacing state.

34 Claims, 5 Drawing Sheets

(51) Int. Cl.
   *H04W 28/02* (2009.01)
   *H04L 29/06* (2006.01)
   *H04N 21/24* (2011.01)
   *H04L 12/853* (2013.01)
   *H04L 12/835* (2013.01)

(52) U.S. Cl.
   CPC ..... *H04W 28/0236* (2013.01); *H04L 47/2416* (2013.01); *H04L 47/30* (2013.01)

(58) Field of Classification Search
   USPC .................................. 709/219, 220, 221
   See application file for complete search history.

(56) References Cited

U.S. PATENT DOCUMENTS

2010/0205318 A1* 8/2010 Melnyk .............. H04N 21/2402
   709/231
2011/0167170 A1* 7/2011 Kovvali ................ H04W 28/06
   709/232

OTHER PUBLICATIONS

Border, J. et al.; "Performance Enhancing Proxies Intended to Mitigate Link-Related Degradations"; Network Working Group Request for Comments 3135; Jun. 1, 2001; 46 pages.

Hong, Y-S. et al.; "A Cost Effective Rate Control for Streaming Video Dedicated to Wireless Handheld Devices"; 2008 International Conference on Multimedia and Ubiquitous Engineering; Piscataway, NJ, US; Apr. 24, 2008; pp. 537-542.

Laoutaris, N. et al.; "Intrastream Synchronization for Continuous Media Streams: A Survey of Playout Schedulers"; IEEE Network; vol. 16, No. 3; May/Jun. 2002; pp. 30-40.

* cited by examiner

METHODS AND SYSTEMS FOR OPTIMAL DELIVERY OF INTERNET VIDEO OVER WIRELESS NETWORKS

FIELD

The present disclosure generally relates to multimedia data transmission. Exemplary embodiments relate to methods and systems for controlling multimedia data transmission via a network.

BACKGROUND

Today, an increasing number of network users are streaming multimedia data, such as videos, across the Internet. The multimedia data streamed can range from short user-generated YouTube® videos to TV shows and full-length movies. As a result, multimedia data transmission has now become a large portion of the Internet traffic. Moreover, multimedia data are increasingly being transmitted using wireless networks, such as cellular networks. While there are many protocols and formats associated with transmitting multimedia data over wireless networks, transmitting of multimedia data to communication devices is often based on one or more variations of progressive download protocols.

Under the progressive download protocols, videos can be transmitted from a multimedia server to a communication device using Hypertext Transfer Protocol (HTTP) or other transport layer protocols. The transport layer, however, may not be aware of the various internal metrics of the video being transmitted. For example, the transport layer is often unaware of the bitrate of the video or the frame rate of a video. As a result, regardless of the rate at which the communication device plays the downloaded video (i.e., the real-time playback rate), the communication device can download the video from the multimedia server at a transmitting rate corresponding to the available network bandwidth.

In some circumstances, the transmitting rate of the video can be higher than the real-time playback rate. For example, a media player of the communication device can play a downloaded video at the frame rate of the video. When the transmitting rate is higher than the real-time playback rate, such as the frame rate, the communication device can store the progressively downloaded video in a local media buffer so that the stored video can be played later. As a result, the video data stored in the local media buffer can grow over time. In some circumstances, however, a user of the communication device may cancel a video session after watching the video for only a short duration. That is, the user may stop watching the video well before the end of the video clip is reached, and thus the un-played video stored in the local media buffer can be wasted. Moreover, if a large portion of the progressively downloaded video is wasted, the network bandwidth may not be utilized efficiently.

One approach to reduce such wastage of the progressively downloaded video is to pace the transmission of video to the communication device based on the knowledge of the frame rate or the bitrate of the video. This approach can be used by video optimization gateways contained, for example, in cellular wireless networks. In particular, a video optimization gateway can transmit video to a communication device at a rate that is the same as or slightly above the real-time playback rate, therefore preventing the local media buffer from storing excessive multimedia data. Moreover, the video optimization gateway can also decode video frames and reduce the video frame rate, image quality, or both, before re-encoding and transmitting the video to the communication device. For example, the video optimization gateway can transmit an initial burst of video at the rate corresponding to the available network bandwidth and then transmit the rest of the video at a paced rate that is equal to or slightly above the real-time playback rate. Transmitting the initial burst of video is required because media players often require a certain amount of video data to be buffered before the media players can start to play the video.

While the above approach of pacing the transmission of a video at or near the real-time playback rate may address the issue of data wastage or inefficient usage of the network bandwidth, it can degrade user experience if, for example, the available bandwidth of the network frequently varies and/or falls below the real-time playback rate of the video over an extended period of time. This may often occur in wireless networks where the radio environment and other conditions can change rapidly and thus resulting in network fading periods. As another example, degradation of the user experience can also occur if multimedia servers are overloaded, resulting in slowing down of the delivery of multimedia data.

Moreover, when the available bandwidth of the network decreases and/or when the multimedia servers cannot deliver multimedia data at the desired rate, the media player of the communication device begins to consume the data in the local media buffer. If the network fading or server overloading extends to a long period of time, the local media buffer can be depleted. As a result, the playback of the video can be stalled or paused until additional multimedia data can be transmitted from the multimedia servers to the communication device.

The above approach of pacing the transmission of a video at or near the real-time playback rate in such situations can increase the likelihood of stalling. In particular, due to the pacing period, the video data that is stored in the local media buffer of the communication device may not be able to grow as fast as the network would otherwise allow. As a result, the local media buffer is susceptible to become depleted and the likelihood of stalling increases. On the other hand, however, if the transmission of the video is not paced, the communication device may download and store a large amount of the video data in the local media buffer, which can increase the chance of data wastage.

BRIEF DESCRIPTION OF THE DRAWINGS

Reference will now be made to the accompanying drawings showing example embodiments of this disclosure. In the drawings.

DETAILED DESCRIPTION OF DRAWINGS

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

The present disclosure generally relates to multimedia data transmission. Exemplary embodiments relate to methods and systems for controlling multimedia data transmission via a network. The methods and systems provided in the present disclosure can enable the reducing of the likelihood of data wastage while preventing substantial degradation of the user experience.

Figure 1:
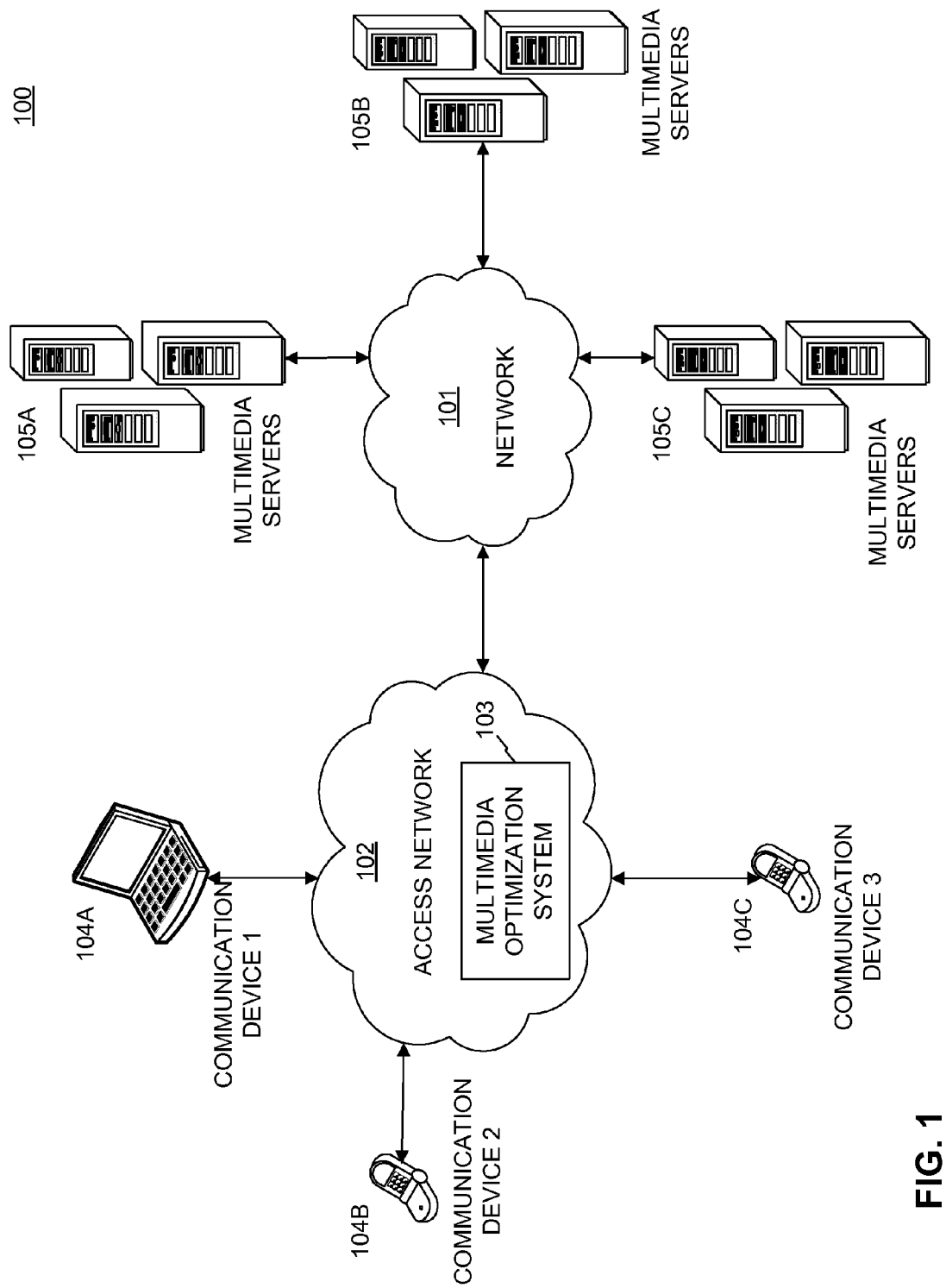
FIG. 1 is a block diagram of an exemplary network system, consistent with embodiments of the present disclosure.

FIG. 1 is a block diagram of an exemplary network system 100. Exemplary network system 100 can be any type of system that transmits data packets over a network. For example, network system 100 can include one or more networks transmitting data packets across wired or wireless networks from servers to communication devices. Network system 100 can include, among other things, a network 101, an access network 102, a multimedia optimization system 103, one or more communication devices 104A-C (collectively as communication device 104), and one or more multimedia servers 105A-C (collectively as multimedia server 105).

Network 101 can include any combination of wide area networks (WANs), local area networks (LANs), or wireless networks suitable for packet-type communications. In some exemplary embodiments, network 101 can be, for example, Internet and X.25 networks. Network 101 can communicate data packets with access network 102 and with one or more multimedia servers 105A-C.

Access network 102 can include one or more radio networks, one or more cellular networks, one or more wide area networks (WANs), one or more local area networks (LANs), wireless networks suitable for packet-type communications, or any combination thereof. Access network 102 can be operated by, for example, service providers such as DSL service provides (e.g., AT&T®), broadband service providers (e.g., Comcast®), and numerous cellular service provides (e.g., AT&T®, Sprint®, and Verizon®). Access network 102 can employ technologies including digital subscriber line (DSL), cable broadband, 802.11 Wi-Fi, Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). For example, in some embodiments, access network 102 can be a General Packet Radio Service (GPRS) core network, which provides mobility management, session management and transport for Internet Protocol packet services in GSM and W-CDMA networks. One or more communication devices (e.g., 104A-C) can communicate with access network 102, which in turn communicates with one or more multimedia servers 105A-C directly or indirectly through network 101. The exemplary network 102 can include, among other things, multimedia optimization system 103.

As shown in FIG. 1, multimedia optimization system 103 can be deployed at one or more locations within access network 102. Multimedia optimization system 103, however, is not limited to be located within the access network 102. Rather, it can be implemented at any intermediate nodes within the network system 100. In some embodiments of access network 102, multimedia optimization system 103 can be incorporated in a gateway node that has visibility into data traffic between all communication devices and multimedia servers. For example, in the case of a mobile broadband access network using GSM or UMTS technology, multimedia optimization system 103 can be located at any intermediate nodes including Traffic Optimization Platforms (TOP), Deep Packet Inspection (DPI) nodes, and other gateway nodes such as the Gateway GPRS Support Node (GGSN). A TOP can perform web and video compression. A DPI node can examine the header (and possibly also the data part) of a packet as it passes an inspection point, searching for protocol non-compliance, viruses, spam, intrusions, or defined criteria to decide whether the packet may pass or if it needs to be routed to a different destination, or, for the purpose of collecting statistical information. A GGSN can be responsible for the interworking between the GPRS network and external packet switched networks, such as the Internet and X.25 networks.

Multimedia optimization system 103 is not limited to be located at the above exemplary nodes. In some embodiments, multimedia optimization system 103 can also be implemented on any one or more gateway nodes that convert formatted data provided in one type of network to a particular format required for another type of network, or any other intermediate nodes if desired. A gateway node, for example, may be a server, a router, a firewall server, a host, or a proxy server. Much like a multimedia server, an HTTP proxy server can accept target URLs within a client's browser window, process the request, and then display the contents of the requested URLs immediately back within the client's browser. In some embodiments, the HTTP proxy servers can be explicit HTTP proxy servers (e.g. Wireless Application Protocol (WAP) Gateways) that process web pages or transparent HTTP proxy servers such as those in traffic management and optimization platforms. A gateway node may be capable of processing webpages that contain images, audios, and videos, and T.120 transmissions alone or in any combination, and is capable of full duplex media translations.

Multimedia optimization system 103 can process any packet type communications including a multimedia data, such as an audio data, a video data, a graphical data, or any combination thereof. Multimedia data transmission can be, for example, part of Transport Control Protocol (TCP) transactions. TCP transactions can include TCP requests from one or more communication devices 104A-C and TCP responses from one or more multimedia servers 105A-C. As an example, through one or more TCP transactions, a communication device (such as communication device 104A) can request multimedia data (e.g., a video clip) stored on a multimedia server (e.g., multimedia server 105A); and the multimedia server can respond to the request by transmitting the multimedia data to the communication device, which then acknowledges the receipt of the multimedia data. When multimedia optimization system 103 is deployed on an intermediate node (e.g., a gateway node in access network 102) that is located between the communication device and the multimedia server, it can process the multimedia data by, for example, optimizing, bursting, pacing, and storing the multimedia data; and obtaining a variety of transactional events and parameters associated with the multimedia data. It is appreciated that multimedia optimization system 103 can process multimedia data transmitted by more than one multimedia server. In some embodiments, multimedia optimization system 103 can be deployed on a particular multimedia server and thus can process the multimedia data transmitted from that particular multimedia server.

In some embodiments, multimedia optimization system 103 can act as a transparent multimedia proxy or an optimization server to intercept streaming multimedia data, to update transmitting state (e.g., a bursting state and a pacing state), to update the delivery schedule, and to optimize streaming multimedia traffic by any desired techniques. As a result, multimedia optimization system 103 can provide controlling of the transmitting rate of the multimedia data without requiring installing a client software to communication device 104 or relying on content providers to adjust their content.

In particular, in some embodiments, multimedia optimization system 103 can continuously monitor the multimedia data stream to obtain an estimated buffer time associated with the multimedia data stored in a local media buffer of communication device 104. Based on the estimated buffer time, multimedia optimization system 103 can update the transmitting state and the delivery schedule so that the multimedia data can be transmitted at an optimized transmitting rate. As an example, if multimedia optimization system 103 determines that the estimated buffer time is greater than or equal to a first threshold condition, it can update the transmitting state to become a pacing state, which can corresponds to a lower transmitting rate. As another example, if multimedia optimization system 103 determines that the estimated buffer time is less than a second threshold condition, it can update the transmitting state to become a bursting state, which can corresponds to a higher transmitting rate. In other words, multimedia optimization system 103 can dynamically adjust the transmitting rate corresponding to one or more transmitting states, and therefore optimizing the user experience and reducing the likelihood of wastage or inefficient use of network bandwidth. Multimedia optimization system 103 is further described in detail below.

One or more communication devices 104A-C can be devices or applications, either in hardware or software, that communicate with access network 102. One or more communication devices 104A-C can be, for example, mobile handheld devices, laptop computers, netbook devices, smart phone devices, tablets, web TV equipment, gaming devices such as Microsoft Xbox® series devices, Nintendo Wii™ series devices, and Sony PlayStation® series devices, or any other devices or applications that can communicate with a network. While it is appreciated that that one or more communication devices 104A-C can include wired devices, one or more communication devices 104A-C are typically wireless devices since the experience for users of wireless devices tends to fluctuate more based on the variation in one or more networks bandwidths and the number of subscribers using those networks. One or more communication devices 104A-C can make requests to and receive responses from one or more multimedia servers 105A-C through access network 102 and network 101.

One or more multimedia servers 105A-C can be any computer systems or software programs that are capable of serving the requests of clients, e.g., one or more communication devices 104A-C. One or more multimedia servers 105A-C can be any types of servers including multimedia servers, application servers, communication servers, database servers, proxy servers, web servers, caching servers, and any other suitable servers. One or more multimedia servers 105A-C can store and provide, among other things, multimedia data. Any requested multimedia data can be provided by one or more multimedia servers 105A-C. One or more multimedia servers 105A-C can communicate with one or more communication devices 104 through network 101 and access network 102.

Figure 2:
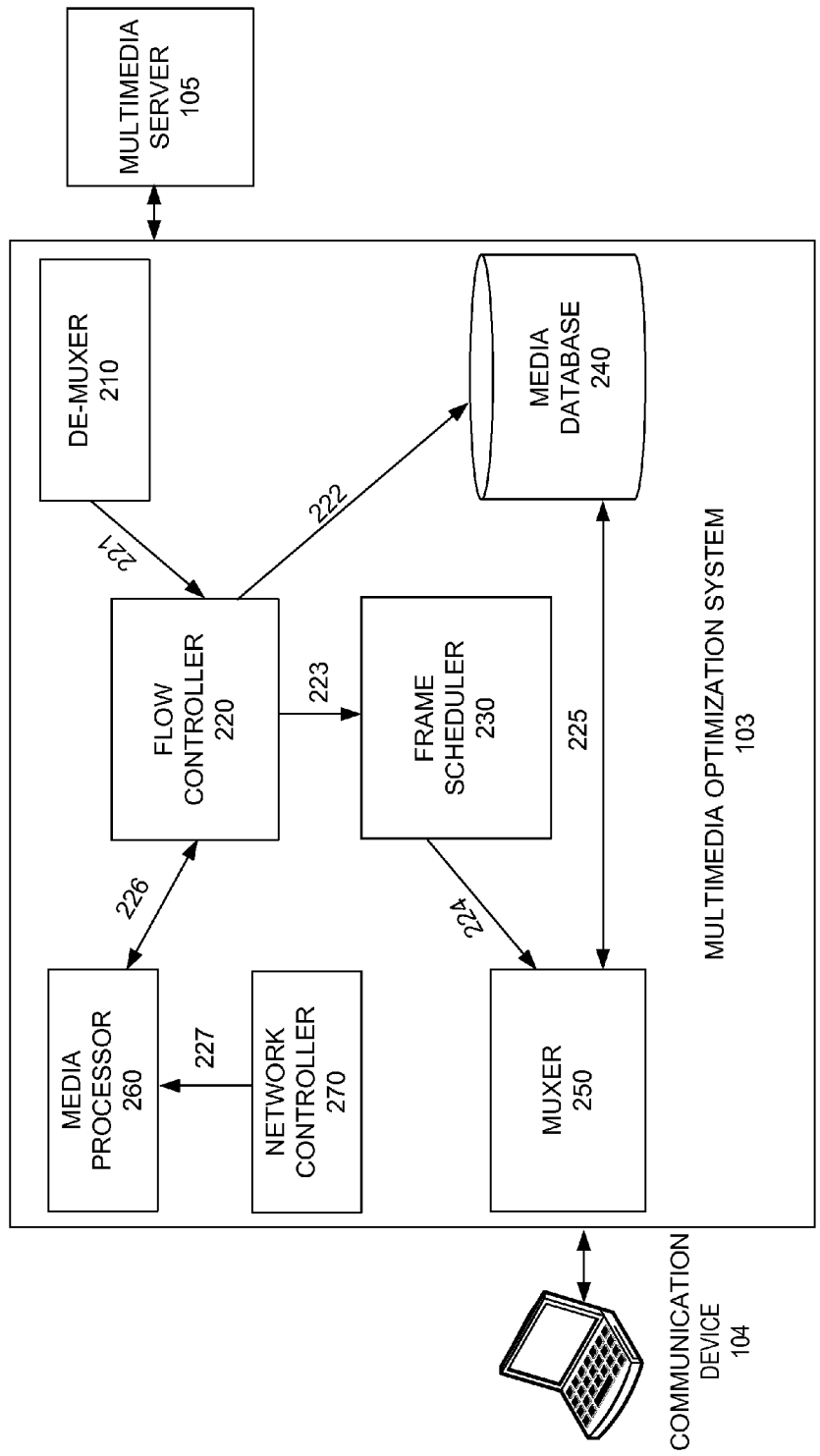
FIG. 2 is a simplified block diagram illustrating an exemplary multimedia optimization system shown in FIG. 1, consistent with embodiments of the present disclosure.

FIG. 2 is a simplified block diagram 200 illustrating an embodiment of exemplary multimedia optimization system 103 shown in FIG. 1. Multimedia optimization system 103 can include, among other things, a de-muxer 210, a flow controller 220, a frame scheduler 230, a media database 240, a muxer 250, a media processor 260, and a network controller 270. Multimedia optimization system 103 can have one or more processors and at least one memory for storing program instructions. The processor(s) can be a single or multiple microprocessors, general purpose processors, graphical processors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs and special purpose computers. Moreover, multimedia optimization system 103 can communicate with communication device 104 and multimedia server 105, either directly or indirectly.

As shown in FIG. 2, multimedia optimization system 103 can include de-muxer 210, also known as a demultiplexer. De-muxer 210 can be configured to receive, retrieve, intercept, parse, or route data packets from multimedia server 105. For example, after acquiring data packets, de-muxer 210 can demultiplex those data packets and process multimedia data that is transmitted through a network, such as video clips, web TV (or Internet Protocol TV), P2PTV, webcasting, and streaming videos. Multimedia data can also be a portion of the video clips, web TV (or Internet Protocol TV), P2PTV, webcasting, and streaming videos. De-muxer 210 can be a software program and/or a hardware device.

Figure 3:
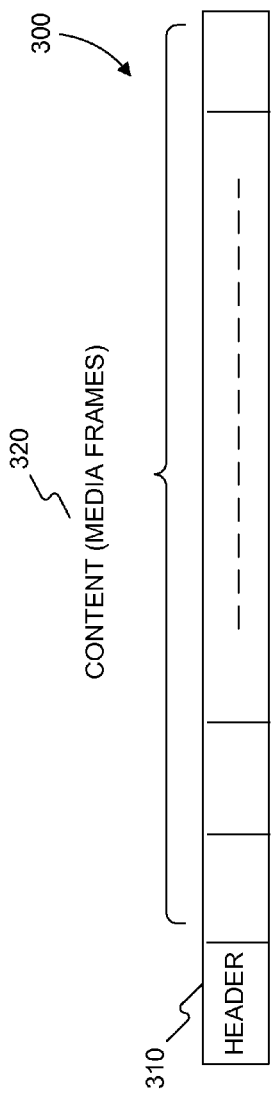
FIG. 3 is an exemplary organization of a media clip, consistent with embodiments of the present disclosure.

In some embodiments, de-muxer 210 can parse the multimedia data, such as a multimedia clip, obtained from multimedia server 105. FIG. 3 illustrates an exemplary organization of a multimedia clip 300 that can be obtained from multimedia server 105. As shown in FIG. 3, multimedia clip 300 can include a header 310 and a content 320 having a number of media frames. Header 310 can include a meta-data of multimedia clip 300. The meta-data can include characteristics of multimedia clip 300 such as the timestamps of the media frames of the video, the frame rate of the video, audio codec, video codec, and encoding parameters. Content 320 can include one or more media frames. Each of the media frames can be associated with a timestamp to indicate the time that the corresponding frame should be rendered by a media player. Thus, the timestamp can determine the native frame rate of the multimedia data that is received. The native frame rate can be modified such that the real-time playback rate of the media player in the communication device differs from the native frame rate. The modification of the frame rate can be performed by, for example, media processor 260 that is interacting with flow controller 220. The modification of the native frame rate is further described in detail below.

Referring to FIGS. 2 and 3, de-muxer 210 can parse the multimedia data, such as multimedia clip 300, to obtain, for example, the media frames in content 320 and the native frame rate contained in meta-data in header 310. In some embodiments, after parsing the multimedia data obtained from multimedia server 105, de-muxer 210 can provide (221) the parsed multimedia data, including the media frames and the native frame rate, to flow controller 220.

As shown in FIG. 2, multimedia optimization system 103 can include flow controller 220. Flow controller 220 can be a software program and/or a hardware device. In some embodiments, after receiving the parsed multimedia data from de-muxer 210, flow controller 220 can control the transmitting of the parsed multimedia data. In some embodiments, for controlling the transmitting of the parsed multimedia data, flow controller 220 can evaluate an estimated buffer time of the local media buffer of communication device 104.

As described above, the local media buffer of communication device 104 can store multimedia data, such as media frames, for playing the content of the multimedia data by a media player of communication device 104. The amount of multimedia data stored in the local media buffer can be estimated, for example, by using the media time associated with the transmitted multimedia data and the time for transmitting the multimedia data to communication device 104. For example, if a multimedia data having 20 seconds of media time is transmitted to communication device 104 in 5 seconds of wall-clock time, flow controller 220 can thus compute the estimated buffer time to be 15 seconds (i.e., 20 seconds−5 seconds). An exemplary definition of the estimated buffer time can be:

$$\text{Estimated buffer time} = \text{Transmitted Media Time} - \text{Elapsed Time} \quad (1)$$

In the above exemplary definition (1), the transmitted media time can be obtained, for example, from the timestamps associated with the transmitted media frames. As described above, meta data can be obtained by parsing the header of the multimedia data, e.g., multimedia clip 300. The timestamps can thus be obtained from the meta-data of the multimedia data. The timestamps can be used to compute the transmitted media time. For example, based on the timestamps associated with the media frames, flow controller 220 can compute that the transmitted media frames correspond to 20 seconds of media time.

In the above exemplary definition (1), the elapsed time can be the time for transmitting the multimedia data from multimedia optimization system 103 to communication device 104. The elapsed time is sometimes also referred to as the wall-clock time. The multimedia data transmitted during the elapsed time can be, for example, a full video clip or a portion of it, such as one or more media frames. The multimedia data can be transmitted using, for example, TCP connections.

As an example, in FIG. 2, multimedia optimization system 103 can transmit multimedia data to communication device 104. Because communication device 104 communicates with multimedia optimization system 103 located in access network 102, multimedia optimization system 103 can process and store the transmitted multimedia data, record and/or extract transactional events and parameters, and obtain any other information that is desired. The transactional events and parameters can include, for example, the time that multimedia optimization system 103 starts to transmit the multimedia data to communication device 104, the time that communication device 104 sends an acknowledgement for receipt of the multimedia data, and the time that multimedia optimization system 103 receives the acknowledgement. The transmitted multimedia data, the transactional events and parameters, and any other desired information can be stored, for example, in media database 240. Flow controller 220 of multimedia optimization system 103 can thus obtain the elapsed time based on the transmission starting time stored in media database 240. As an example, the elapsed time can be the current time subtracted by the transmitting starting time. In some embodiments, flow controller 220 of multimedia optimization system 103 can also obtain the elapsed time using the time that multimedia optimization system 103 receives the acknowledgement. For example, the elapsed time can be the acknowledgement time subtracted by the transmitting starting time. After obtaining both the elapsed time and the transmitted media time, flow controller 220 can evaluate the estimated buffer time based on, for example, exemplary definition (1). In some embodiments, the estimated buffer time can be stored in media database 240 or flow controller 220.

In some embodiments, flow controller 220 can dynamically evaluate the estimated buffer time of communication device 104. As an example, flow controller 220 can evaluate that the next media frame to be transmitted corresponds to an initial frame of the multimedia data being transmitted to communication device 104, flow controller 220 can thus determine the estimated buffer time to be zero. An estimated buffer time of zero can indicate that the local media buffer of communication device 104 has not stored have any multimedia data yet. As another example, flow controller 220 can also evaluate a current estimated buffer time based on a previously estimated buffer time. As described above, the estimated buffer time can be stored in media database 240 or flow controller 220. Thus, flow controller 220 can obtain the stored previous estimated buffer time, compute a current transmitted media time and a current elapsed time, and evaluate the current estimated buffer time.

As an example of evaluating a current estimated buffer time, flow controller 220 can evaluate that the previous estimated buffer time is 15 seconds. Flow controller 220 can also evaluate that the current transmitted media time is 20 seconds, which corresponds to the media time of one or more media frames currently being transmitted to communication device 104. Flow controller 220 can also compute that the elapsed time for transmitting the 20 seconds media frames is 10 seconds. Based on the above evaluation or computation, flow controller 220 can evaluate the current estimated buffer time to be 25 seconds (i.e., 15 seconds of previous estimated buffer time+20 seconds of transmitted media time−10 seconds of elapsed time). After flow controller 220 evaluates the current estimated buffer time, it can store the current estimated buffer time in media database 240 or flow controller 220. As a result, in some embodiments, flow controller 220 can dynamically evaluate the current estimated buffer time of the local media buffer of communication device 104.

In some embodiments, for computing the current estimated buffer time, an accumulated elapsed time and an accumulated transmitted media time can be used. For example, if a first media time of 20 seconds is transmitted in a first elapsed time of 5 seconds, and a second media time of 20 seconds is transmitted in a second elapsed time of 10 seconds, the accumulated transmitted media time and the accumulated elapsed time can be 40 seconds and 15 seconds, respectively. And the current estimated buffer time is 25 seconds using the exemplary definition (1). In some embodiments, the accumulated elapsed time or the wall-clock time can be reset. For example, network congestion or overloading of multimedia servers 105 can occur at any time when a multimedia data, such as a video clip, is being transmitted to communication device 104. Under these circumstances, multimedia optimization system 103 can be forced to decrease the transmitting rate for transmitting the remaining multimedia data or can be forced to completely stop transmitting. As a result, the media player of communication device 104 can deplete the multimedia data stored in the local media buffer. Depletion of the multimedia data can cause the media player to stall. In some embodiments, if stalling occurs, the transmission starting time (i.e., the time that multimedia optimization system 103 starts to transmit) that is used to compute the elapsed time or the wall-clock time can be reset to the time when transmitting of the remaining multimedia data to the communication device resumes.

After evaluating the estimated buffer time, flow controller 220 can update a current transmitting state based on the estimated buffer time. A transmitting state can be, for example, a bursting state and a pacing state. In some embodiments, multimedia optimization system 103 can transmit multimedia data at a transmitting rate corresponding to the bursting state or the pacing state.

As described above, flow controller 220 can determine that the next media frame corresponds to an initial frame of the multimedia data to be transmitted to communication device 104. In some embodiments, initial transmitting of the multimedia data can require that the transmitting rate be at a high level such that the local media buffer of communication device 104 can quickly store a required number of media frames to start playing the multimedia data. Thus, the transmitting rate in the bursting state can be a rate that corresponds to the available network bandwidth so that the media player of communication device 104 can start to play the content of the multimedia data as soon as possible. In some embodiments, in a bursting state, multimedia optimization system 103 can transmit the multimedia data to communication device 104 at a transmitting rate that substantially equals the multiplication of the real-time playback rate, such as the native frame rate of the multimedia data, and a delivery schedule ratio. As an example, multimedia optimization system 103 can transmit media frames to communication device 104 at a rate of 150 frames per second, while the real-time playback rate (e.g., the native frame rate) is 30 frames per second. In this case, the delivery schedule ratio is 5 (i.e., 150 frames per second/30 frames per second). In some embodiments, the transmitting rate in a bursting state can be a rate that is lower than the available network bandwidth, but substantially higher than the real-time playback rate (e.g., 5 times higher). It is appreciated that in a bursting state, the transmitting rate or the delivery schedule ratio can also be any other number that is desired.

In some embodiments, if the current transmitting state of multimedia optimization system 103 is the bursting state (e.g., when multimedia optimization system 103 starts to transmit a multimedia data to communication device 104), flow controller 220 can update the current transmitting state based on the estimated buffer time, so that multimedia optimization system 103 can either remain in the bursting state or change to the pacing state. As an example, flow controller 220 can determine whether the estimated buffer time is greater than or equal to a first threshold condition, such as a high-water mark. If the estimated buffer time (e.g., 15 seconds) is less than the first threshold condition (e.g., 20 seconds), flow controller 220 does not update the transmitting state and multimedia optimization system 103 can remain in the bursting state. Remaining in the bursting state can indicate that multimedia optimization system 103 can continue to transmit the remaining multimedia data to communication device 104 at a rate that is, for example, substantially higher than the real-time playback rate or correspond to available network bandwidth. If the estimated buffer time (e.g., 25 seconds) is greater than or equal to the first threshold condition (e.g., 20 seconds), flow controller 220 can update the current transmitting state to the pacing state.

In some embodiments, in the pacing state, multimedia optimization system 103 can also transmit the multimedia data to communication device 104 at a rate that is the multiplication of the real-time playback rate, such as the native frame rate of the multimedia data, and a delivery schedule ratio. The delivery schedule ratio configured in the pacing state can be different from, such as lower than, that configured in the bursting state, as described above. As an example, multimedia optimization system 103 can transmit video frames to communication device 104 at a rate of 45 frames per second, while the real-time playback rate (e.g., the native media frame rate) is 30 frames per second. In this case, the delivery schedule ratio is 1.5 (i.e., 45 frames per second/30 frames per second). As another example, multimedia optimization system 103 can also transmit media frames to communication device 104 at a rate of 15 frames per second, while the real-time playback rate (e.g., the native video frame rate) is 30 frames per second. In this case, the delivery schedule ratio is 0.5 (i.e., 15 frames per second/30 frames per second). As another example, multimedia optimization system 103 can also transmit media frames to communication device 104 at substantially the same rate as the real-time playback rate. In this case, the delivery schedule ratio is 1. In the pacing state, in some embodiments, for the media player of communication device 104 to play the content of multimedia data without stalling, the transmitting rate can be at least substantially the same as the real-time playback rate, such as the native frame rate of the multimedia data.

In some embodiments, if the current transmitting state of multimedia optimization system 103 is the pacing state, flow controller 220 can also update the current transmitting state based on the estimated buffer time, so that multimedia optimization system 103 can either remain in the pacing state or change to the bursting state. As an example, after evaluating the current estimated buffer time, as described above, flow controller 220 can determine whether the current estimated buffer time is less than a second threshold condition, such as a low-water mark. If the estimated buffer time (e.g., 20 seconds) is greater than or equal to the second threshold condition (e.g., 15 seconds), flow controller 220 does not update the transmitting state and multimedia optimization system 103 can remain in the pacing state. Remaining in the pacing state can indicate that multimedia optimization system 103 can continue to transmit multimedia data to communication device 104 at a rate that is, for example, substantially lower than the transmitting rate of the bursting state so that the local media buffer does not store excessive data. If the estimated buffer time (e.g., 10 seconds) is less than the second threshold condition (e.g., 15 seconds), flow controller 220 can update the current transmitting state to the bursting state. In the bursting state, for example, multimedia optimization system 103 can transmit at a substantially higher rate than that of the pacing state.

In some embodiments, flow controller 220 can update the transmitting state from the bursting state to the pacing state, and vice versa, as many times as needed during the transmitting of a multimedia data, such as a video clip. As described above, updating of the transmitting state from the bursting state to the pacing state can be triggered if the estimated buffer time of the local media buffer of communication device 104 is greater than or equal to the first threshold condition. And updating of the transmitting state from the pacing state to the bursting state can be triggered if the estimated buffer time of the local media buffer of communication device 104 is less than the second threshold condition.

In some embodiments, the first threshold condition, such as the high-water mark, can be greater than the second threshold condition, such as the low-water mark. In some embodiments, the first threshold condition and the second threshold condition can be preconfigured and provided to flow controller 220. The difference between the first threshold condition and the second threshold condition can have an impact on the frequency at which flow controller 220 updates the transmitting state. For example, if the difference between the first threshold condition and the second threshold condition is small, flow controller 220 can update the transmitting state (e.g., updating from the bursting state to the pacing state, and vice versa) at a frequency higher than that corresponds to a large difference between the first threshold condition and second threshold condition.

In some embodiments, the first threshold condition can be equal to the second threshold condition. Thus, if the estimated buffer time is greater than or equal to the first/second threshold condition, flow controller 220 can update the transmitting state to be the pacing state. And if the estimated buffer time is less than the first/second threshold condition, flow controller 220 can update the transmitting state to be the bursting state. In some embodiments, when the first threshold condition is equal to the second threshold condition, the delivery schedule ratio in the pacing state can be selected or configured to be equal to or greater than 1. As a result, the transmitting rate in the pacing state can be equal to or greater than the real-time playback rate, such as the native frame rate of the multimedia data. Such a transmitting rate can reduce the likelihood that multimedia optimization system 103 updating the transmitting state at an undesirably high frequency.

In some embodiments, the first threshold condition and the second threshold condition can be configured corresponding to a number of service objectives, such as improving user experience and reducing data wastage. As an example, balancing between the purposes of reducing data wastage and improving user experience can be providing via the configuration of first threshold condition and the second threshold condition. In particular, larger values of the first threshold condition and second threshold condition can reduce the likelihood of video stalling and thus can improve user experience. On the other hand, larger values of the first threshold condition and/or the second threshold condition can increase the average amount of data that is wasted due to early cancellation of playing the content of the multimedia data stored in the local media buffer of communication device 104.

In some embodiments, a service provider can provide the configuration of the first threshold condition and the second threshold condition based on their service objectives. For example, for a particular service provider, reducing data wastage may not be a primary concern. Instead, the primary focus can be improving user experience. Accordingly, the first threshold condition and the second threshold condition can be configured to large values such that multimedia optimization system 103 can be kept in the bursting state during the transmission of the entire multimedia data, such as a full video clip. As a result, the transmission of multimedia data can be rapidly completed.

In some embodiments, the first threshold condition and the second threshold condition can also be configured based on other criteria, such as the user preferences, video length, tariff plans, location of the subscriber, level of congestion in the cell associated with the subscriber, agreements with the content provider, purchased data, or any other desired criteria. As an example, some multimedia data can only be purchased and thus cannot be freely downloaded. If the circumstances indicate that purchased multimedia data, such as a full-length movie, is less likely to be cancelled by the user when the multimedia data is downloaded, the first threshold condition and the second threshold condition can be configured to be high values such that the purchased movie can be rapidly downloaded.

In some embodiments, the first threshold condition and the second threshold condition can be different for different types of communication device 104. For example, the first threshold condition and second threshold condition can be configured to 40 seconds for an iPhone device and to 10 seconds for an Android device.

In some embodiments, the first threshold condition and the second threshold condition can be adaptively configured during the course of transmitting of a multimedia data, such as a video session, based on occurrences of stalling or other criteria. As an example, the first and second threshold conditions can be increased by a fixed percentage every time a stalling event occurs. As another example, the first threshold condition and the second threshold condition can also be increased if the estimated buffer time of the local media buffer of communication device 104 falls below a third threshold condition (e.g., a second low-water mark) that is below the second threshold condition (e.g., the first low-water mark). In particular, flow controller 220 can dynamically adjust the first and the second threshold conditions by, for example, 10% if the estimated client buffer falls below the third threshold condition. Dynamically increasing the first and the second threshold conditions can reduce the likelihood of video stalling in the future, and thus improve the user experience. It is appreciated that other heuristic algorithms can also be used to adaptively adjust the first and second threshold conditions based on any desired criteria.

It is further appreciated that flow controller 220 can also control the transmitting of multimedia data in any number of transmitting states that are desired. Flow controller 220 can also use any number of threshold conditions desired corresponding to the number of transmitting states.

As described above, flow controller 220 can evaluate the estimated buffer time and determine whether to update the transmitting state based on comparison of the estimated buffer time with the first and/or second threshold conditions. Moreover, based on the transmitting state, the transmitting rate can be determined. In some embodiments, the transmitting rate can be measured in frames per second. Furthermore, flow controller 220 can store (222) the multimedia data in media database 240 for transmission and instruct (223) the frame scheduler 230 to trigger transmission of the multimedia data according to a delivery schedule provided by flow controller 220.

As shown in FIG. 2, multimedia optimization system 103 can include frame scheduler 230. Frame scheduler 230 can be a software program and/or a hardware device that can trigger transmission of the multimedia data, such as media frames, according to the delivery schedule provided by flow controller 220. In some embodiments, flow controller 220 can determine the delivery schedule based on the transmitting rate. For example, if a transmitting rate is 20 frames per second, flow controller 220 can instruct frame scheduler 230 to trigger transmission of a media frame every 0.05 second or 50 millisecond (i.e., 1 second/20 frames). It is appreciated that flow controller 220 can also instruct (223) the frame scheduler 230 to trigger transmission of the multimedia data in any manner that is desired.

As shown in FIG. 2, multimedia optimization system 103 can include media database 240. Media database 240 can be a structured collection of records or data corresponding to the multimedia data, such as media frames. The structure can be organized as a structured file, a relational database, an object-oriented database, or any other appropriate database. A database management system can be used to manage and provide access to media database 240. In some embodiments, media database 240 can store and provide the multimedia data for transmission. The multimedia data stored in media database 240 can be either processed or not processed by de-muxer 210 and/or flow controller 220. For example, the multimedia data stored in media database 240 can be media frames received from de-muxer 210, or can be processed media frames received from media processor 260. The multimedia data stored can correspond to the multimedia data for transmission between communication device 104 and the multimedia server 105. For example, media database 204 can provide buffering to store multimedia data that cannot be forwarded to communication device 104 yet because the current transmission state is the pacing state and thus the remaining multimedia data are being transmitted at a paced transmitting rate.

In some embodiments, media database 240 can also store transactional events and parameters, meta-data, and any other information. The information stored in media database 240 can be provided by, for example, multimedia server 105, de-muxer 210, flow controller 220, frame scheduler 230, media processor 260, muxer 250, and communication device 104.

In some embodiments, media database 240 can store and organize its information based on per multimedia data, per media player, per communication device, per multimedia server, per subscriber (user), per organization, per network, per service provider, or any combination thereof. For example, if multimedia optimization system 103 provides control over the transmission of multimedia data for each communication device, media database 240 can be organized according to each communication device via its phone number, MAC address, etc.

Media database 240 can be a hardware device alone or in combination with a software program and can be located local to or remote from multimedia optimization system 103. Media database 240 can be combined with other components of multimedia optimization system 103, such as frame scheduler 230, or muxer 250. In some embodiments, it can also be external to multimedia optimization system 103.

Multimedia optimization system 103 can include muxer 250, which is also known as a multiplexer. Muxer 250 can be a software program and/or a hardware device that transmits multimedia data, such as video frames, according to the instruction of frame scheduler 230. In some embodiments, frame scheduler 230 can trigger (224) muxer 250 to transmit multimedia data, such as media frames, according to the delivery schedule provided by flow controller 220. After the triggering, and in some embodiments, after obtaining (225) the stored multimedia data to be transmitted, muxer 250 can multiplex the multimedia data before transmitting the multimedia data to communication device 104 at the scheduled time according to the delivery schedule.

As shown in FIG. 2, multimedia optimization system 103 can include media processor 260. Media processor 260 can be a software program and/or a hardware device that can perform multimedia data processing such as audio compression, video compression, filtering, frame rate conversion, noise reduction, etc. As an example, media processor 260 can perform media data optimization, such as media bitrate reduction. In particular, among other things, media processor 260 can change the content of media frames to lower media quality and therefore reduce the size of the multimedia data.

As described above, a multimedia data, such as a video clip, obtained from multimedia server 105 can have a native frame rate (e.g., 30 frames per second). De-muxer 210 can parse the multimedia data, such as multimedia clip 300, to obtain, for example, the media frames contained in content 320 and the native frame rate contained in meta-data in header 310. In some embodiments, after parsing the multimedia data obtained from multimedia server 105, de-muxer 210 can transmit the parsed multimedia data, including the media frames and the native frame rate, to flow controller 220. Flow controller 220, in some embodiments, can further transmit (226) the parsed multimedia data, including the media frames, to media processor 260, which can change the frame rate of the parsed multimedia data. For example, media processor 260 can encode the media frames such that the encoded media frames have a frame rate of 20 frames per second, which is lower than the native frame rate of 30 frames per second. As described above, to reduce the likelihood of stalling during the playback of the content of the multimedia data at communication device 104, multimedia optimization system 103 can transmit the multimedia data at a rate that is greater than or equal to the real-time playback rate (e.g., the native frame rate). By encoding the media frames such that the native frame rate is reduced to a lower frame rate, the real-time playback rate can also be reduced and thus the likelihood of stalling can also be reduced. Media processor 260 can store processed, such as encoded, multimedia data in media database 240.

Multimedia optimization system 103 can include network controller 270. Network controller 270 can be a software program and/or a hardware device that detects network conditions and can instruct media processor 260 to process the multimedia data accordingly. For example, among other things, it can detect degradation of bandwidth when the network becomes congested, and instruct media processor 260 to reduce media frame rate or media quality as described above.

Figure 4:
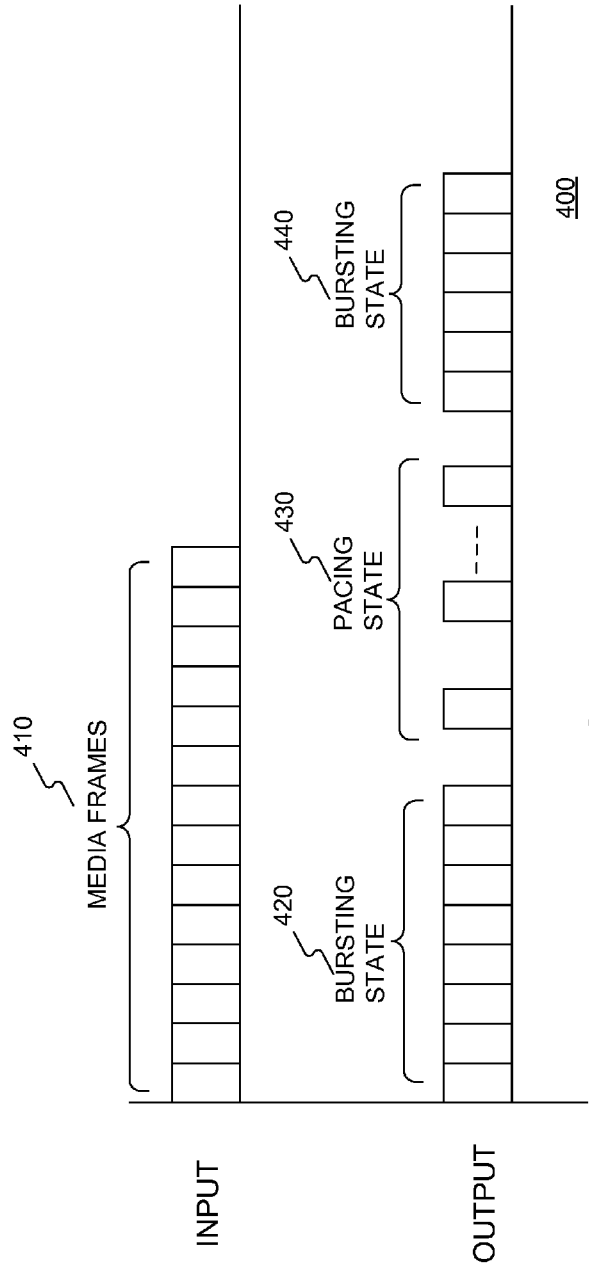
FIG. 4 is an exemplary input and output diagram of an exemplary multimedia optimization system for controlling multimedia data transmission, consistent with embodiments of the present disclosure.

FIG. 4 is an exemplary input and output diagram 400 of multimedia optimization system 103 for controlling multimedia data transmission. As shown in FIG. 4, multimedia optimization system 103 can obtain the multimedia data, such as multimedia clip 300, from multimedia server 105. As shown in FIG. 3, the multimedia data can include a header (e.g., header 310) and a content (e.g., content 320) having a number of media frames. Thus, as an example, the input of multimedia optimization system 103 can include one or more media frames 410. Each of media frames 410 can be associated with a timestamp to indicate the time that the corresponding frame should be rendered by a media player.

After obtaining the input, multimedia optimization system 103 can determine a current transmitting state based on an estimated buffer time associated with communication device 104. As described above, in some embodiments, if the estimated buffer time is configured to be zero corresponding to an initial transmission, or if the estimated buffer time is less than the second threshold condition (e.g., the low-water mark), flow controller 220 of multimedia optimization system 103 can determine, or update, the current transmitting state to be the bursting state, such as bursting state 420. As shown in FIG. 4, in some embodiments, during bursting state 420, multimedia optimization system 103 can transmit media frames at a high transmitting rate such that the local media buffer of communication device 104 can quickly store a required number of media frames to start playing the content of the multimedia data or to reduce the likelihood of stalling. As an example, the transmitting rate during bursting state 420 can be 150 frames per second.

In some embodiments, if the estimated buffer time is greater than or equal to the first threshold condition (e.g., the high-water mark), multimedia optimization system 103 can update the current transmitting state to be the pacing state, such as pacing state 430. As shown in FIG. 4, in some embodiment, during pacing state 430, multimedia optimization system 103 can transmit media frames at a low transmitting rate such that the local media buffer of communication device 104 can store the media frames at a desired pace to reduce the likelihood of data wastage. As an example, the transmitting rate during pacing state 430 can be 20 frames per second.

As described above, multimedia optimization system 103 can update the transmitting state from the bursting state to the pacing state, and vice versa, as many times as needed during the transmitting of a multimedia data, such as a video clip. For example, after updating the current transmitting state from bursting state 420 to pacing state 430, multimedia optimization system 103 can update current transmitting state from pacing state 430 to bursting state 440. As described above, the update of the transmitting state from the bursting state to the pacing state can be triggered if the estimated buffer time of the local media buffer of communication device 104 is greater than or equal to the first threshold condition (high water mark). And the update of transmitting state from the pacing state to the bursting state can be triggered if the estimated buffer time of the local media buffer of communication device 104 is less than the second threshold condition (low water mark).

Figure 5:
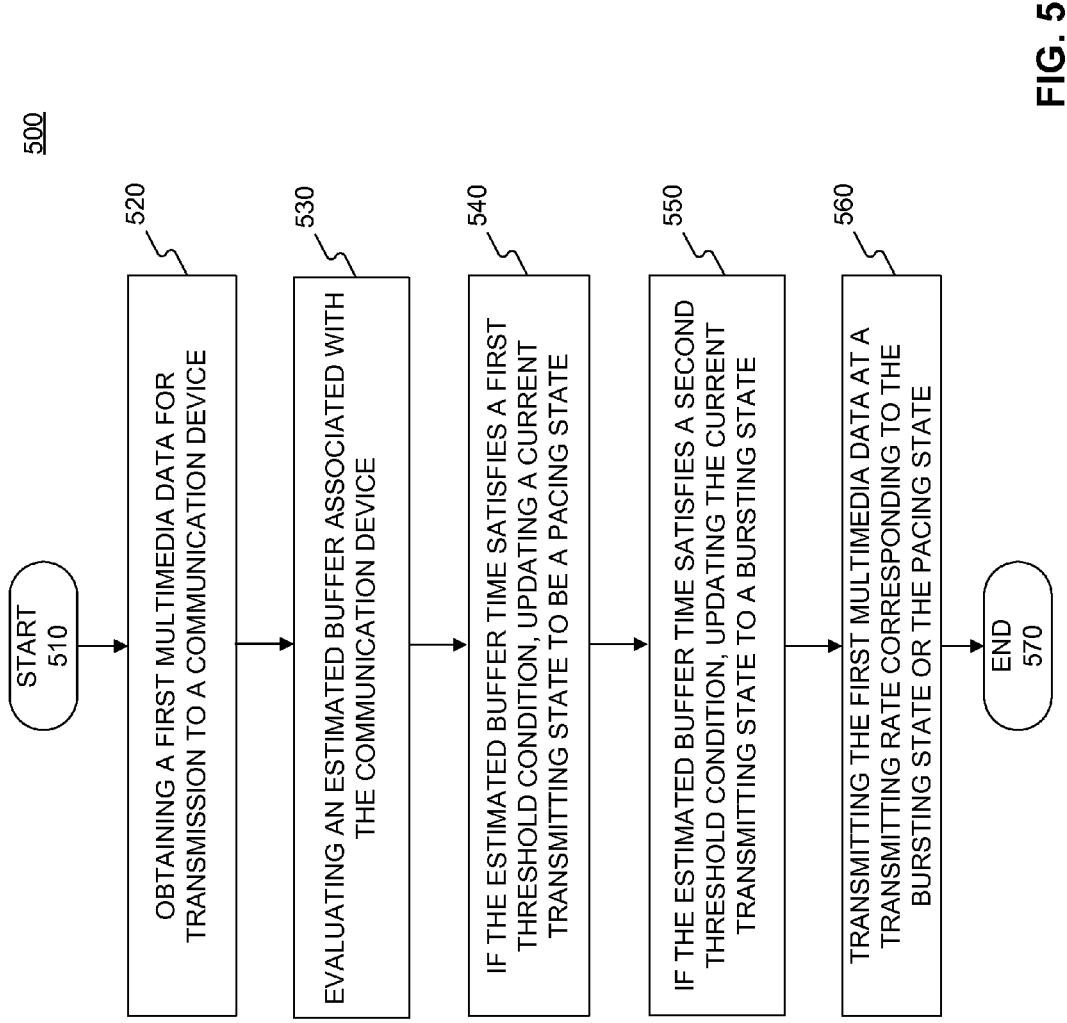
FIG. 5 is a flowchart representing an exemplary method for controlling multimedia data transmission via a network, consistent with embodiments of the present disclosure.

FIG. 5 is a flowchart representing an exemplary method 500 for controlling multimedia data transmission via a network. It will be readily appreciated that the illustrated procedure can be altered to delete steps or further include additional steps. After initial step 510, a multimedia optimization system can obtain (520) a first multimedia data for transmission to a communication device (e.g., communication device 104). The obtaining of the multimedia data can be performed by a de-muxer (e.g., de-muxer 210) of the multimedia optimization system. In some embodiments, the multimedia optimization system can receive the first multimedia data from a multimedia server (e.g., multimedia server 105). The multimedia optimization system can parse the multimedia data, such as multimedia clip 300, to obtain, for example, the media frames in a content portion of the multimedia data and the native frame rate contained in meta-data in a header portion of the multimedia data. In some embodiments, after parsing the first multimedia data obtained from the multimedia server, the multimedia optimization system can transmit the parsed multimedia data, including the media frames and the native frame rate, to a flow controller.

As shown in FIG. 5, the multimedia optimization system can evaluate (530) an estimated buffer time associated with the communication device. This evaluation can be performed by a flow controller (e.g., flow controller 220) of the multimedia optimization system. In some embodiments, the multimedia optimization system can obtain a transmitted media time corresponding to a second multimedia data that has been transmitted to the communication device and an elapsed time for transmitting the second multimedia data. The multimedia optimization system can thus compute the estimated buffer time using the transmitted media time and the elapsed time. For example, if the second multimedia data that has 20 seconds of media time is transmitted to the communication device in 5 seconds of elapsed time, the multimedia optimization system can thus compute the estimated buffer time to be 15 seconds (i.e., 20 seconds–5 seconds).

After evaluating the estimated buffer time associated with the communication device, the multimedia optimization system (e.g., the flow controller) can update (540) a current transmitting state to be a bursting state if the estimated buffer time satisfies a first threshold condition. If the estimated buffer time satisfies a second threshold condition, the multimedia optimization system (e.g., the flow controller) can update (550) the current transmitting state to be a pacing state. The steps of evaluating the estimated buffer time, updating a current transmitting state to be a bursting state, and updating the current transmitting state to be a pacing state are further described in detail below.

After evaluating the estimated buffer time and/or updating the current transmitting state, the multimedia optimization system can transmit (560) the first multimedia data at a transmitting rate corresponding to the bursting state or the pacing state. This transmission can be performed by a muxer (e.g., muxer 250) of the multimedia optimization system. In some embodiments, the multimedia optimization system can determine the transmitting rate based on the multiplication of a real-time playback rate and a delivery schedule ratio. The real-time playback rate can correspond to a playback rate of a media player of the communication device. In some embodiments, the real-time playback rate can be the native frame rate of the first multimedia data (e.g., 30 frames per second). In some embodiments, the real-time playback rate can be a frame rate different from the native frame rate. For example, a media processor (e.g., media processor 260) can encode the media frames of the first multimedia data at a second frame rate that is smaller than the native frame rate.

In some embodiments, the delivery schedule ratio can be larger in the bursting state than in a pacing state. And thus the transmitting rate of the bursting state can be larger than that of the pacing state. For example, in the bursting state, the delivery schedule ratio can be 5, which indicates that the transmitting rate (e.g., 150 frames per second) can be 5 times higher than the real-time playback rate of the first multimedia data (e.g., 30 frames per second). It is appreciated that the delivery schedule ratio can be any desired number for the bursting state and the pacing state. Therefore, the transmitting rate can also be any number that is desired. After step 560, method 500 can proceed to a stop 570. It is appreciated that method 500 can also be repeated in any number of times for controlling the transmission of any amount of multimedia data.

Figure 6:
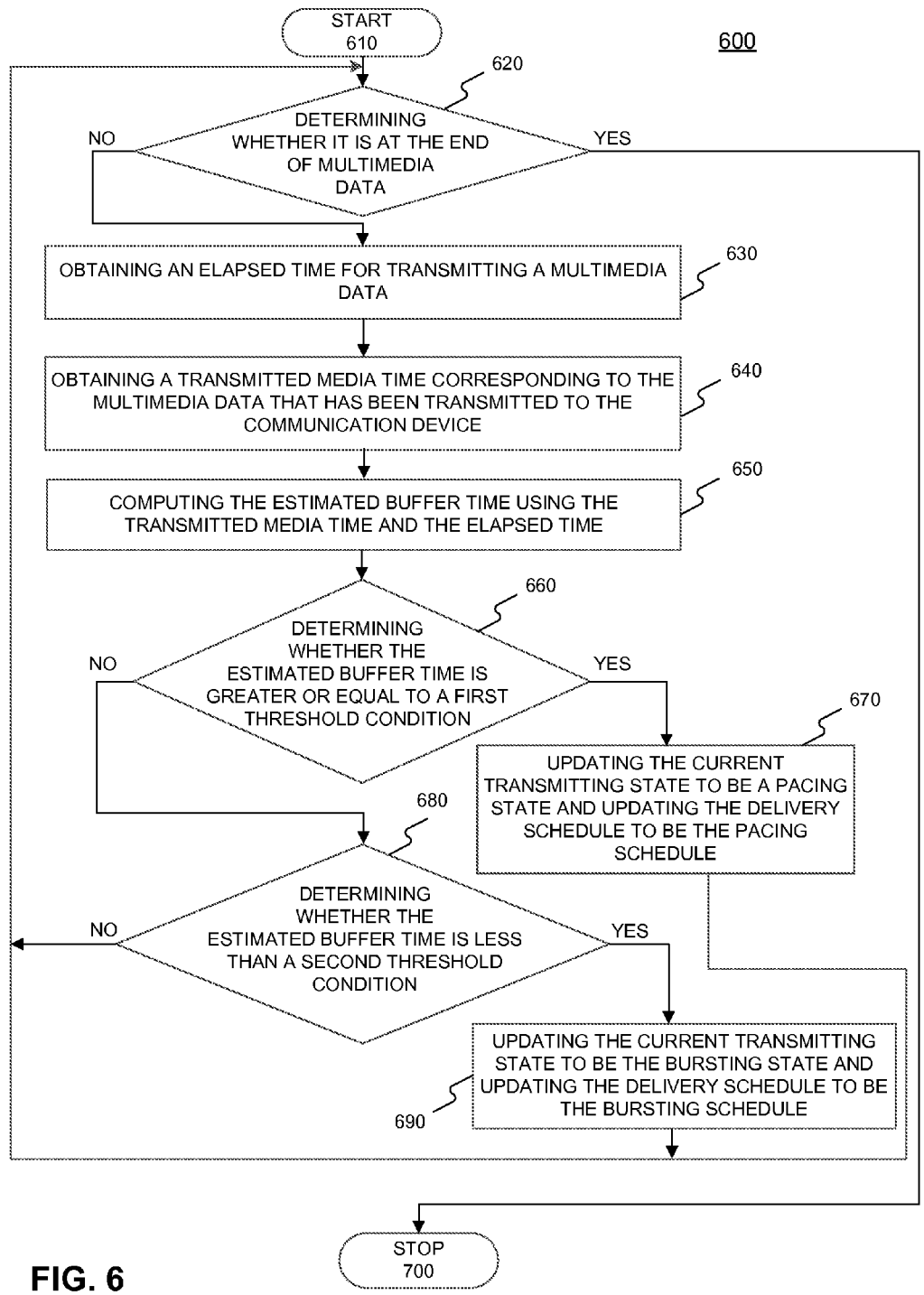
FIG. 6 is a flowchart representing an exemplary method for evaluating an estimated buffer time and updating a current transmitting state, consistent with embodiments of the present disclosure.

FIG. 6 is a flowchart representing an exemplary method 600 for evaluating an estimated buffer time and updating the current transmitting state. It will be readily appreciated that the illustrated procedure can be altered to delete steps or further include additional steps. After initial step 610, the multimedia optimization system (e.g., multimedia optimization system 103) can determine (620) whether it is at the end of the multimedia data to be transmitted. This determination can be performed by a flow controller (e.g., flow controller 220) of the multimedia optimization system. If the end of the multimedia data to be transmitted is reached, method 600 can proceed to a stop 700.

If the end of the multimedia data to be transmitted is not reached, the multimedia optimization system (e.g., the flow controller) can obtain (630) an elapsed time for transmitting a multimedia data, such as the second multimedia data. The elapsed time is sometimes also referred to as the wall-clock time. The second multimedia data can be, for example, a portion of the first multimedia data, such as one or more media frames. The multimedia optimization system (e.g., the flow controller) can also obtain (640) a transmitted media time corresponding to the multimedia data that has been transmitted to the communication device. The multimedia data can be transmitted using, for example, TCP connections. After obtaining both the elapsed time and the transmitted media time, the multimedia optimization system (e.g., the flow controller) can compute (650) the estimated buffer time using the transmitted media time and the elapsed time.

As described above, the multimedia optimization system can transmit multimedia data to the communication device (e.g., communication device 104). Because the communication device communicates with the multimedia optimization system, the multimedia optimization system can process and store the transmitted multimedia data, record and/or extract transactional events and parameters, and obtain any other information that is desired. The transactional events and parameters can include, for example, the time that the multimedia optimization system start to transmit the multimedia data to the communication device, the time that the communication device send an acknowledgement for receipt of the multimedia data, and the time that the multimedia optimization system receives the acknowledgement. The transmitted multimedia data, the transactional events and parameters, and any other desired information can be stored, for example, in a media database (e.g., media database 240). The multimedia optimization system can thus obtain the elapsed time based on the transmission starting time. As an example, the elapsed time can be the current time subtracted by the transmitting starting time. In some embodiments, the multimedia optimization system can also obtain the elapsed time using the time that the multimedia optimization system receives the acknowledgement. For example, the elapsed time can be the acknowledgement time subtracted by the transmitting starting time. After obtaining the elapsed time and the transmitted media time, the multimedia optimization system can evaluate the estimated buffer time based on, for example, exemplary definition (1) as described above. In some embodiments, the estimated buffer time can be stored in the media database or the flow controller of the multimedia optimization system.

In some embodiments, the multimedia optimization system can dynamically evaluate the estimated buffer time of the communication device. As an example, the multimedia optimization system can determine that the next media frame corresponds to an initial frame of the multimedia data being transmitted to the communication device, the estimated buffer time can thus be determined to be zero, indicating that the local media buffer of the communication device has not stored have any multimedia data yet. As another example, the multimedia optimization system can also evaluate a current estimated buffer time based on a previously estimated buffer time. As described above, the estimated buffer time can be stored in the media database. Thus, the multimedia optimization system can obtain the stored previous estimated buffer time, compute a current transmitted media time and a current elapsed time, and evaluate the current estimated buffer time.

As an example of evaluating a current estimated buffer time, the previous estimated buffer time can be 15 seconds. The multimedia optimization system can evaluate that the previous estimated buffer time is 15 seconds. The multimedia optimization system can also evaluate that the current transmitted media time is 20 seconds, which corresponds to the media time of one or more media frames currently being transmitted to the communication device. The multimedia optimization system can also compute that the elapsed time for transmitting the 20 seconds media frames is 10 seconds. Based on the above evaluation or computation, the multimedia optimization system can evaluate the current estimated buffer time to be 25 seconds (i.e., 15 seconds of previous estimated buffer time+20 seconds of transmitted media time−10 seconds of elapsed time). After the multimedia optimization system evaluates the current estimated buffer time, it can store the current estimated buffer time in the media database or the flow controller of the multimedia optimization system. As a result, in some embodiments, the multimedia optimization system can dynamically evaluate the current estimated buffer time of the local media buffer of the communication device.

In some embodiments, for computing the current estimated buffer time, an accumulated elapsed time and an accumulated transmitted media time can be used. For example, if a first media time of 20 seconds is transmitted in a first elapsed time of 5 seconds, and a second media time of 20 seconds is transmitted in a second elapsed time of 10 seconds, the accumulated transmitted media time and the accumulated elapsed time can be 40 seconds and 15 seconds, respectively. And the current estimated buffer time is 25 seconds using the exemplary definition (1).

In some embodiments, the accumulated elapsed time or the wall-clock time can be reset. For example, network congestion or overloading of the multimedia servers (e.g., multimedia server 105) can occur at any time when a multimedia data, such as a video clip, is being transmitted to the communication device. Under these circumstances, the multimedia optimization system can be forced to decrease the transmitting rate for transmitting the remaining multimedia data or can be forced to stop transmitting completely. As a result, the media player of the communication device can deplete the multimedia data buffered in the local media buffer. Depletion of the multimedia data can cause the media player to stall. In some embodiments, if stalling occurs, the transmission starting time (i.e., the time that the multimedia optimization system starts to transmit) for computing the elapsed time or the wall-clock time can be reset to the time when transmitting of the remaining multimedia data to the communication device resumes.

After evaluating the estimated buffer time, the multimedia optimization system (e.g., the flow controller) can determine (660) whether the estimated buffer time is greater than or equal to a first threshold condition, such as a high-water mark. If the estimated buffer time is greater than or equal to the first threshold condition, the multimedia optimization system (e.g., the flow controller) can update (670) the current transmitting state to be a pacing state. In some embodiments, the multimedia optimization system can also transmit the multimedia data according to delivery schedule corresponding to the transmitting rate of the pacing state.

In some embodiments, if the current transmitting state of the multimedia optimization system is the bursting state (e.g., when the multimedia optimization system starts to transmit the multimedia data to the communication device), the multimedia optimization system can update the current transmitting state based on the estimated buffer time, so that the multimedia optimization system can either remain in the bursting state or change to the pacing state. As an example, the multimedia optimization system can determine whether the estimated buffer time is greater than or equal to a first threshold condition, such as a high-water mark. If the estimated buffer time (e.g., 25 seconds) is greater than or equal to the first threshold condition (e.g., 20 seconds), the multimedia optimization system can update (670) the current transmitting state to the pacing state. If the estimated buffer time (e.g., 15 seconds) is less than the first threshold condition (e.g., 20 seconds), the multimedia optimization system does not update the transmitting state and the multimedia optimization system can remain in the bursting state. Remaining in the bursting state can indicate that the multimedia optimization system can continue to transmit multimedia data to the communication device at a rate that is, for example, substantially higher than the real-time playback rate.

If the estimated buffer time is less than the first threshold condition, the multimedia optimization system (e.g., the flow controller) can determine (680) whether the estimated buffer time is less than a second threshold condition, such as a low-water mark. If the estimated buffer time is less than the second threshold condition, the multimedia optimization system can update (690) the current transmitting state to be the bursting state. In some embodiments, the multimedia optimization system can also transmit the multimedia data according to delivery schedule corresponding to the transmitting rate of the bursting state.

In some embodiments, if the current transmitting state of the multimedia optimization system is the pacing state, the multimedia optimization system can also update the current transmitting state based on the estimated buffer time, so that the multimedia optimization system can either remain in the pacing state or change to the bursting state. As an example, after evaluating the estimated buffer time, as described above, the multimedia optimization system can determine whether the estimated buffer time is less than the second threshold condition. If the estimated buffer time (e.g., 10 seconds) is less than the second threshold condition (e.g., 15 seconds), the multimedia optimization system can update the current transmitting state to the bursting state. In a bursting state, as described above, the multimedia optimization system can transmit at a substantially higher rate than that of the pacing state. If the estimated buffer time (e.g., 20 seconds) is greater than or equal to the second threshold condition (e.g., 15 seconds), the multimedia optimization system does not update the transmitting state and the multimedia optimization system can remain in the pacing state. Remaining in the pacing state can indicate that the multimedia optimization system can continue to transmit the multimedia data to the communication device at a rate that is, for example, substantially lower than the transmitting rate of the bursting state.

If the multimedia optimization system determines that estimated buffer time is less than the first threshold condition and greater than or equal to the second threshold condition, the multimedia optimization system can remain in the current transmitting state, whether it is a bursting state or a pacing state. The multimedia optimization system can proceed to repeat step 620 to determine whether it is at the end of the multimedia data. Steps 620 through 690 can be repeated any number of times as desired. If the multimedia optimization system determines that it is at the end of the multimedia data, method 600 can proceed to stop 700. It is appreciated that method 600 can apply whether the initial or current transmitting state is the bursting state or the pacing state.

The methods disclosed herein may be implemented as a computer program product, i.e., a computer program tangibly embodied in an information carrier, e.g., in a non-transitory machine readable storage device or in a propagated signal, for execution by, or to control the operation of, data processing apparatus, e.g., one or more programmable processors, a computer, or multiple computers. A computer program can be written in any form of programming language, including compiled or interpreted languages, and it can be deployed in any form, including as a stand-alone program or as one or more modules, one or more components, one or more subroutines, or one or more other units suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A system for controlling multimedia data transmission to a communication device via a network, the system comprising:
   a de-muxer configured to obtain first multimedia data for transmission;
   a flow controller configured to:
      evaluate, based on timestamps included in second multimedia data that have been transmitted prior to the first multimedia data and an elapsed time for transmitting the second multimedia data, an estimated buffer time associated with the communication device, the estimated buffer time representing an estimation of an amount of multimedia data stored in a buffer of the communication device,
      if the estimated buffer time satisfies a first threshold condition, update a current transmitting state to be a pacing state, and
      if the estimated buffer time satisfies a second threshold condition, update the current transmitting state to be a bursting state; and
   a muxer configured to transmit the first multimedia data at a transmitting rate corresponding to the bursting state or the pacing state.

2. The system of claim 1, wherein the first multimedia data includes at least one of a video data, an audio data, and a graphical data.

3. The system of claim 1, wherein the de-muxer is configured to obtain the first multimedia data further comprises the de-muxer to:

receive the first multimedia data from a multimedia server;
parse the first multimedia data to obtain a meta data and a content data; and
obtain a first frame rate of the multimedia data based on the meta data.

4. The system of claim 3, further comprising:
a network controller configured to obtain network conditions; and
a media processor configured to encode, based on the network conditions, the content data to have a second frame rate that is different from the first frame rate.

5. The system of claim 1, wherein the flow controller is configured to evaluate the estimated buffer time associated with the communication device further comprises the flow controller to:
obtain the elapsed time; and
obtain a transmitted media time corresponding to the second multimedia data that has been transmitted to the communication device; and
wherein the estimated buffer time is determined using the transmitted media time and the elapsed time.

6. The system of claim 5, wherein the flow controller is configured to evaluate the estimated buffer time associated with the communication device further comprises the flow controller to:
obtain the transmitted media time based on a wall-clock time.

7. The system of claim 6, wherein the flow controller is configured to evaluate the estimated buffer time associated with the communication device further comprises the flow controller to:
responsive to detecting a stall, reset a transmission starting time to update the wall-clock time.

8. The system of claim 1, wherein the flow controller is configured to update the current transmitting state to be the pacing state if the estimated buffer time is greater than or equal to the first threshold condition, and wherein the flow controller is configured to update the current transmitting state to be the bursting state if the estimated buffer time is less than the second threshold condition.

9. The system of claim 1, wherein the first threshold condition is greater than or equal to the second threshold condition.

10. The system of claim 1, wherein at least one of the first threshold condition and the second threshold condition is adaptively configured based on one or more occurrences of stalling associated with the communication device.

11. The system of claim 1, wherein the first threshold condition and the second threshold condition are adaptively configured if the estimated buffer time falls below a third threshold condition, wherein the third threshold condition is less than the second threshold condition.

12. The system of claim 1, wherein the flow controller is further configured to determine the transmitting rate based on the multiplication of a real-time playback rate and a delivery schedule ratio, the real-time playback rate being a playback rate of a media player of the mobile communication device.

13. The system of claim 1, wherein at least one of the first threshold condition and the second threshold condition is adaptively configured based on at least one of: a service policy of reducing data wastage, a size of the first multimedia data, a location of the communication device, and a level of congestion in a network associated with the communication device.

14. A method for controlling multimedia data transmission to a communication device via a network, the method being performed by one or more processors of a server and comprising:
obtaining first multimedia data for transmission;
evaluating, based on timestamps included in second multimedia data that have been transmitted prior to the first multimedia data and an elapsed time for transmitting the second multimedia data, an estimated buffer time associated with the communication device, wherein the estimated buffer time represents an estimation of an amount of multimedia data stored in a buffer of the communication device
responsive to-the estimated buffer time satisfying a first threshold condition, updating a current transmitting state to be a pacing state, and
responsive to the estimated buffer time satisfying a second threshold condition, updating the current transmitting state to be a bursting state; and
transmitting the first multimedia data at a transmitting rate corresponding to the bursting state or the pacing state.

15. The method of claim 14, wherein the first multimedia data includes at least one of a video data, an audio data, and a graphical data.

16. The method of claim 14, wherein obtaining the first multimedia data comprises:
receiving the first multimedia data from a multimedia server;
parsing the first multimedia data to obtain a meta data and a content data; and
obtaining a first frame rate of the multimedia data based on the meta data.

17. The method of claim 16, further comprising:
obtaining network conditions; and
encoding, based on the network conditions, the content data to have a second frame rate that is different from the first frame rate.

18. The method of claim 14, wherein evaluating the estimated buffer time associated with the communication device comprises:
obtaining the elapsed time; and
obtaining a transmitted media time corresponding to the second multimedia data that has been transmitted to the communication device; and
wherein the estimated buffer time is determined using the transmitted media time and the elapsed time.

19. The method of claim 14, wherein updating the current transmitting state to be the pacing state comprises updating the current transmitting state to be the pacing state if the estimated buffer time is greater than or equal to the first threshold condition, and wherein updating the current transmitting state to be the bursting state comprises updating the current transmitting state to be the bursting state if the estimated buffer time is less than the second threshold condition.

20. The method of claim 14, wherein the first threshold condition is greater than or equal to the second threshold condition.

21. The method of claim 14, wherein at least one of the first threshold condition and the second threshold condition is adaptively configured based on one or more occurrences of stalling associated with the communication device.

22. The method of claim 14, wherein the first threshold condition and the second threshold condition are adaptively configured if the estimated buffer time falls below a third threshold condition, wherein the third threshold condition is less than the second threshold condition.

23. The method of claim 14, further comprising determining the transmitting rate based on the multiplication of a real-time playback rate and a delivery schedule ratio, the real-time playback rate being a playback rate of a media player of the mobile communication device.

24. A non-transitory computer readable storage medium storing a set of instructions that are executable by at least one processor of a server to cause the server to perform a method for controlling multimedia data transmission to a communication device via a network, the method comprising:
 obtaining first multimedia data for transmission;
 evaluating, based on timestamps included in second multimedia data that have been transmitted prior to the first multimedia data and an elapsed time for transmitting the second multimedia data, an estimated buffer time associated with the communication device, wherein the estimated buffer time representing an estimation of an amount of multimedia data stored in a buffer of the communication device;
 if the estimated buffer time satisfies a first threshold condition, updating a current transmitting state to be a pacing state, and
 if the estimated buffer time satisfies a second threshold condition, updating the current transmitting state to be a bursting state; and
 transmitting the first multimedia data at a transmitting rate corresponding to the bursting state or the pacing state.

25. The computer readable storage medium of claim 24, wherein the first multimedia data includes at least one of a video data, an audio data, and a graphical data.

26. The computer readable storage medium of claim 24, wherein obtaining the first multimedia data comprises:
 receiving the first multimedia data from a multimedia server;
 parsing the first multimedia data to obtain a meta data and a content data; and
 obtaining a first frame rate of the multimedia data based on the meta data.

27. The computer readable storage medium of claim 26, further comprising:
 obtaining network conditions; and
 encoding, based on the network conditions, the content data to have a second frame rate that is different from the first frame rate.

28. The computer readable storage medium of claim 24, wherein evaluating the estimated buffer time associated with the communication device comprises:
 obtaining the elapsed time; and
 obtaining a transmitted media time corresponding to the second multimedia data that has been transmitted to the communication device; and
 wherein the estimated buffer time is determined using the transmitted media time and the elapsed time.

29. The computer readable storage medium of claim 24, wherein updating the current transmitting state to be the pacing state comprises updating the current transmitting state to be the pacing state if the estimated buffer time is greater than or equal to the first threshold condition, and wherein updating the current transmitting state to be the bursting state comprises updating the current transmitting state to be the bursting state if the estimated buffer time is less than the second threshold condition.

30. The computer readable storage medium of claim 24, wherein the first threshold condition is greater than or equal to the second threshold condition.

31. The computer readable storage medium of claim 24, wherein at least one of the first threshold condition and the second threshold condition is adaptively configured based on one or more occurrences of stalling associated with the communication device.

32. The computer readable storage medium of claim 24, wherein the first threshold condition and the second threshold condition are adaptively configured if the estimated buffer time falls below a third threshold condition, wherein the third threshold condition is less than the second threshold condition.

33. The computer readable storage medium of claim 24, wherein the method further comprising determining the transmitting rate based on the multiplication of a real-time playback rate and a delivery schedule ratio, the real-time playback rate being a playback rate of a media player of the mobile communication device.

34. A method for controlling multimedia data transmission to a communication device via a network, the method being performed by one or more processors of a server and comprising:
 obtaining a first multimedia data for transmission;
 transmitting a first portion of the first multimedia data at a transmitting rate corresponding to a pacing state;
 evaluating, based on timestamps included in the first portion of the first multimedia data and an elapsed time for transmitting the first portion of the first multimedia data, an estimated buffer time associated with the communication device, wherein the estimated buffer time represents an estimation of an amount of multimedia data stored in a buffer of the communication device;
 updating, based on the evaluation of the estimated buffer time, the current transmitting state from a pacing state to a bursting state; and
 transmitting a second portion of the first multimedia data at a transmitting rate corresponding to the bursting state.

* * * * *